(12) United States Patent
Lewis

(10) Patent No.: US 10,096,805 B1
(45) Date of Patent: Oct. 9, 2018

(54) BATTERY ADAPTER FOR BATTERY-POWERED DEVICE

(71) Applicant: Adam T. Lewis, Hartford, SD (US)

(72) Inventor: Adam T. Lewis, Hartford, SD (US)

( * ) Notice: Subject to any disclaimer, the term of this patent is extended or adjusted under 35 U.S.C. 154(b) by 396 days.

(21) Appl. No.: 14/936,768

(22) Filed: Nov. 10, 2015

Related U.S. Application Data

(60) Provisional application No. 62/135,378, filed on Mar. 19, 2015.

(51) Int. Cl.
  *H01M 2/10* (2006.01)
  *H01M 6/06* (2006.01)

(52) U.S. Cl.
  CPC .......... *H01M 2/1055* (2013.01); *H01M 6/06* (2013.01); *H01M 2220/30* (2013.01)

(58) Field of Classification Search
  CPC .. H01M 2/1055; H01M 2/105; H01M 2/1027; H01M 2/1033; H01M 2/1016; H01M 2/1005; H01M 2/202; H01M 2/24; H01M 2/30; H01M 6/06; H01M 2220/30
  See application file for complete search history.

(56) References Cited

U.S. PATENT DOCUMENTS

| | | |
|---|---|---|
| 4,991,225 A | 2/1991 | Holcomb |
| 5,200,280 A | 4/1993 | Karasa |
| 5,239,451 A * | 8/1993 | Menke ............ F21L 2/00 362/199 |
| 5,240,787 A | 8/1993 | Goldschmidt |
| 5,575,682 A | 11/1996 | Alexander |
| 6,117,575 A | 9/2000 | Dinsdale |
| 6,166,519 A | 12/2000 | Gault |
| 6,851,828 B1 | 2/2005 | Hansen |
| 7,122,973 B1 * | 10/2006 | Ivers ............ H05B 39/047 315/200 A |
| 7,635,197 B2 | 12/2009 | Man |
| 2007/0279902 A1 | 12/2007 | Kim |
| 2013/0094197 A1 | 4/2013 | Opolka |
| 2013/0147390 A1 * | 6/2013 | Opolka ............ F21L 4/027 315/294 |

\* cited by examiner

*Primary Examiner* — Raymond Alejandro
(74) *Attorney, Agent, or Firm* — Jeffrey A. Proehl; Woods, Fuller, Shultz & Smith, PC

(57) ABSTRACT

A battery adapter cartridge for removably positioning in a battery compartment of an electrically-powered device to provide electrical power may comprise an elongated case having opposite ends and defining at least one bay configured to receive a battery. The case may include a perimeter wall defining a case interior and each bay occupies a section of the case interior, with an opening formed in the case for each bay. The case may include a pair of end walls each positioned at a respective end of the cartridge and a pair of electrical contacts mounted on the opposite ends walls. The cartridge may include at least one electrical connector configured to connect to a battery positioned in the at least one bay and the electrical connectors and the electrical contacts are connected.

17 Claims, 4 Drawing Sheets

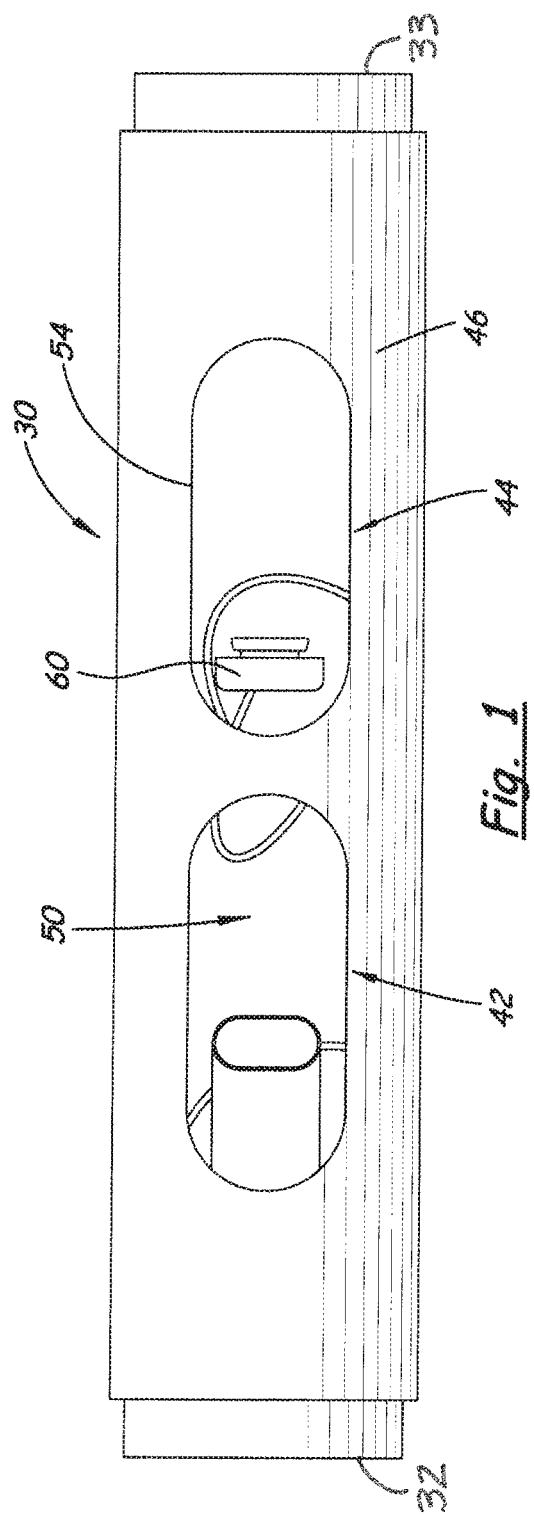
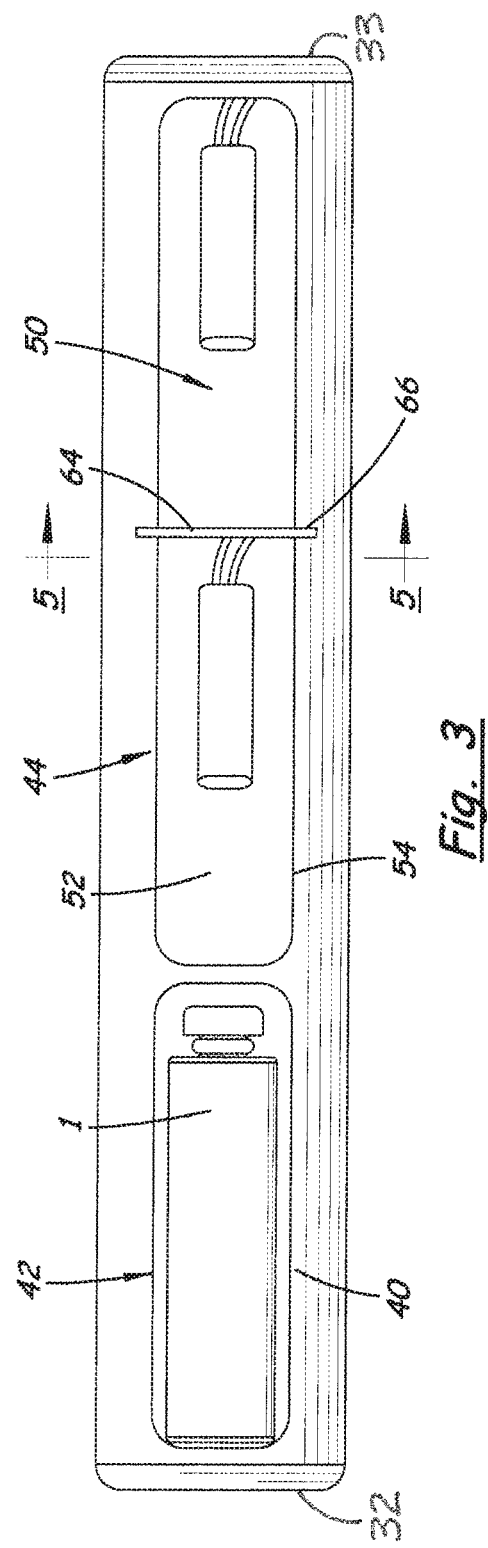

BATTERY ADAPTER FOR BATTERY-POWERED DEVICE

REFERENCE TO RELATED APPLICATION

This application is claims the priority of U.S. Provisional Patent Application No. 62/135,378, filed Mar. 19, 2015, which is hereby incorporated by reference in its entirety.

BACKGROUND

Field

The present disclosure relates to battery adapters and more particularly pertains to a new battery adapter for a battery-powered device for converting the type of battery power used by a device such as a flashlight.

SUMMARY

In one aspect, the present disclosure relates to a battery adapter cartridge for removably positioning in a battery compartment of an electrically-powered device to provide electrical power to the device. The cartridge may comprise an elongated case having opposite ends and defining at least one bay configured to receive a battery. The case may include a perimeter wall extending about a case interior, with each said bay occupying a section of the case interior. An opening may be formed in the case for the at least one bay. The case may include a pair of end walls each positioned at a respective end of the cartridge, with a pair of electrical contacts mounted on the housing with a first one of the electrical contacts being mounted on a first end wall and a second one of the electrical contacts being mounted on a second end wall. The cartridge may include at least one electrical connector configured to connect to a battery positioned in the at least one bay, with the electrical connectors and the electrical contacts being electrically connected.

In another aspect, the disclosure relates to a system including an electrically-powered device including a housing defining a battery compartment configured to removably receiving cell battery or batteries, and a battery adapter cartridge removably positioned in the battery compartment of the electrically-powered device to provide electrical power to the device. The cartridge may comprise an elongated case having opposite ends and defining at least one bay configured to receive a battery. The case may include a perimeter wall extending about a case interior, with each said bay occupying a section of the case interior. An opening may be formed in the case for the at least one bay. The case may include a pair of end walls each positioned at a respective end of the cartridge, with a pair of electrical contacts mounted on the housing with a first one of the electrical contacts being mounted on a first end wall and a second one of the electrical contacts being mounted on a second end wall. The cartridge may include at least one electrical connector configured to connect to a battery positioned in the at least one bay, with the electrical connectors and the electrical contacts being electrically connected.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1 is a schematic perspective view of a new battery adapter cartridge for a battery-powered device according to the present disclosure.

FIG. 3 is a schematic top view of the battery adapter cartridge, according to an illustrative embodiment.

DETAILED DESCRIPTION

Figure 2:
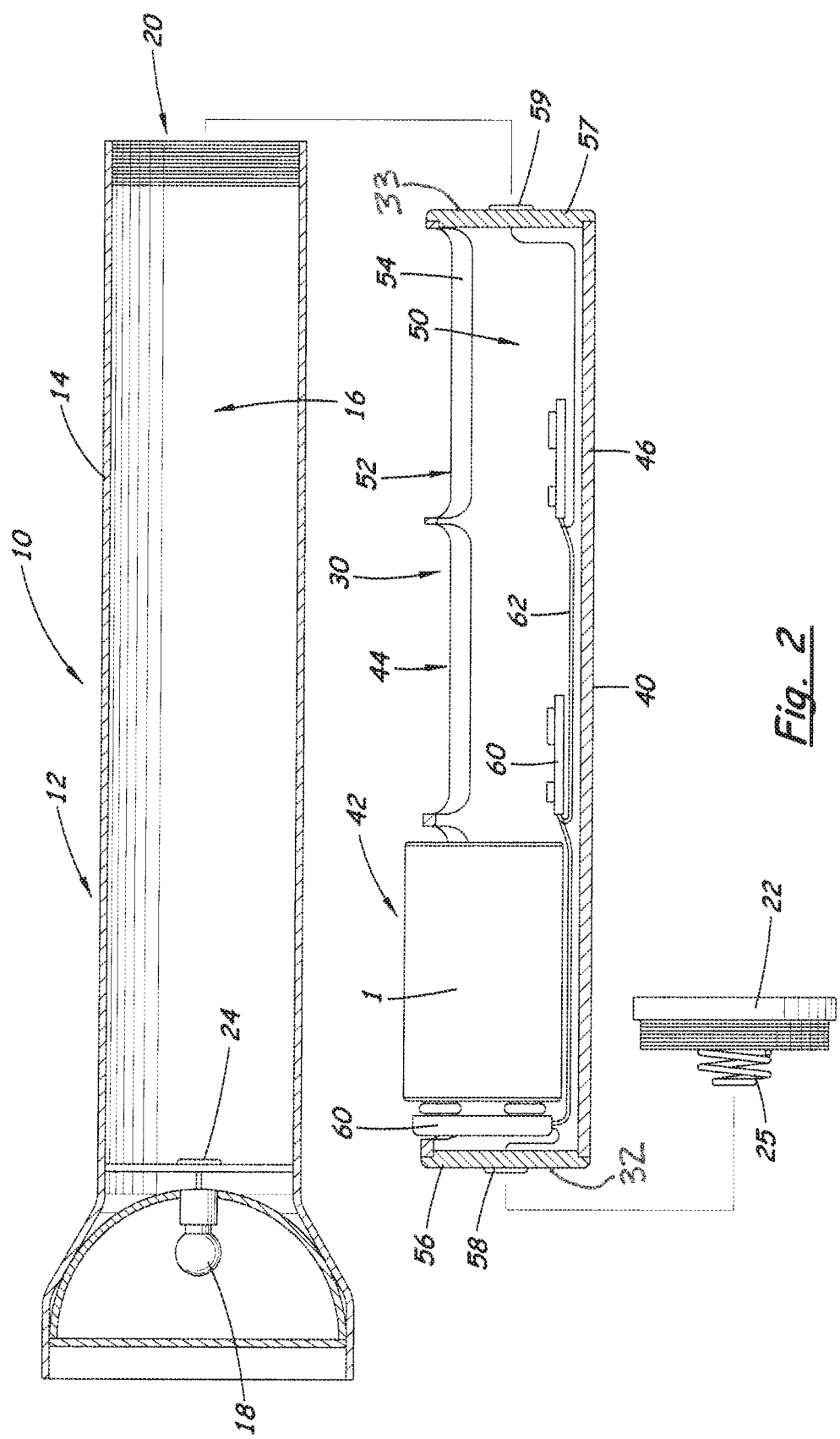
FIG. 2 is a schematic exploded sectional view of a system including a device, illustratively a flashlight, and the battery adapter cartridge, according to an illustrative embodiment.
Figure 4:
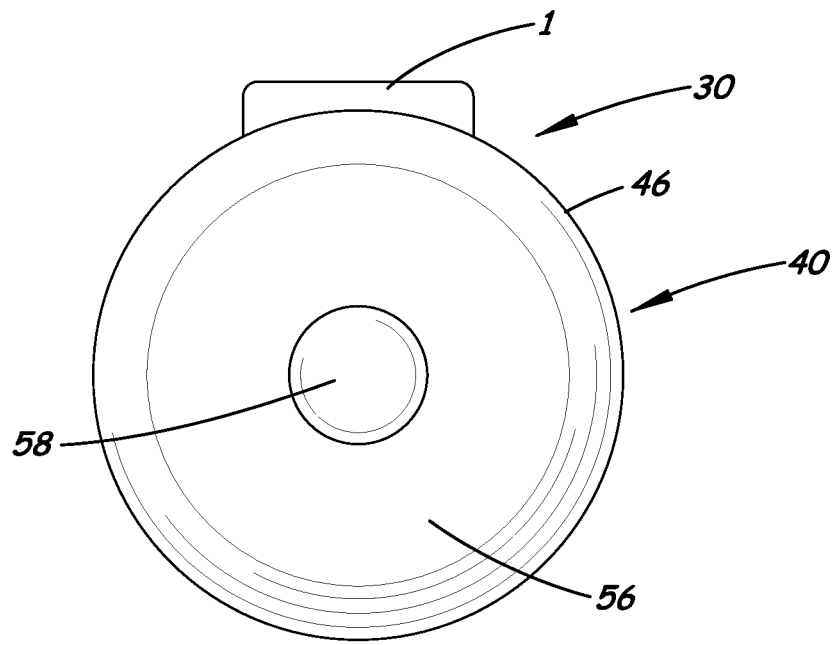
FIG. 4 is a schematic end view of the battery adapter cartridge, according to an illustrative embodiment.
Figure 5:
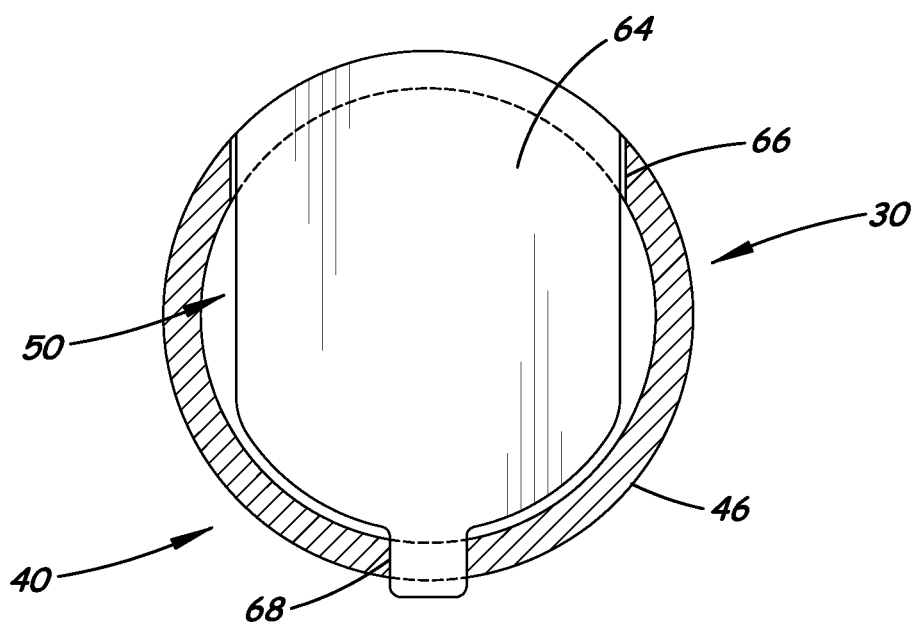
FIG. 5 is a schematic sectional view of the battery adapter cartridge taken along line 5-5 of FIG. 3, according to an illustrative embodiment.
Figure 6:
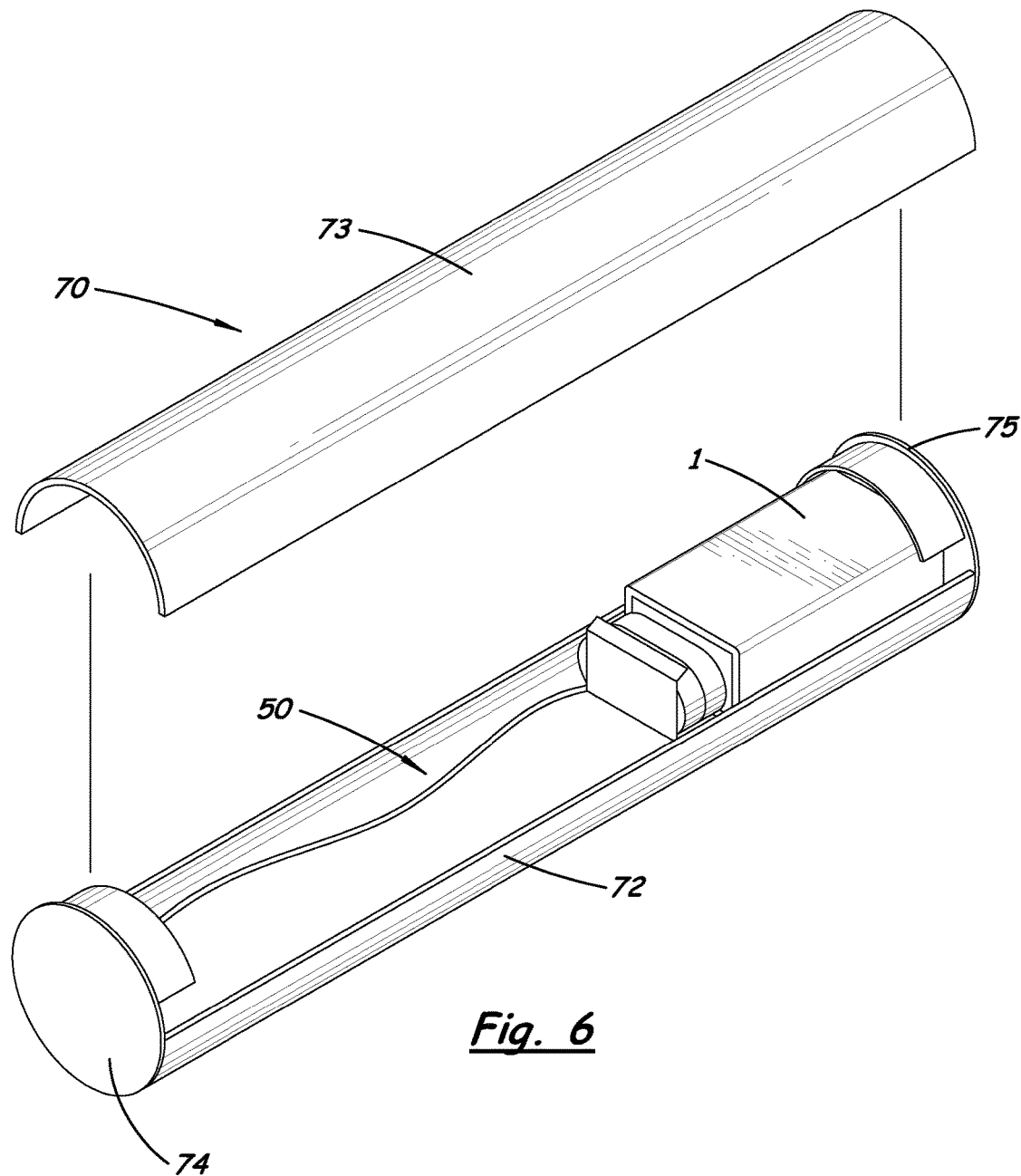
FIG. 6 is a schematic exploded view of an embodiment of the system utilizing a pair of clam shell portions for the case, according to an illustrative embodiment.

With reference now to the drawings, and in particular to FIGS. 1 through 6 thereof, a new battery adapter for a battery-powered device embodying the principles and concepts of the disclosed subject matter will be described.

Applicant has recognized that it would be beneficial to be able to adapt battery-utilizing devices, such as flashlights, to employ batteries of higher power even while reducing the number of batteries utilized by the device. Further, applicant has recognized that it would be advantageous to be able to carry non-battery items, such as supplies, in the battery compartment of the device. Providing the capability to reduce the number of batteries utilized to power the device, whether at the same power level or a higher power level, tends to free up space in the battery compartment that may be utilized for storage of items in the typically protected (e.g., weather resistant or water resistant or water tight) environment provided by the battery compartment of the device. This is particularly applicable to flashlights.

In one aspect, the disclosure relates to a system 10 for illuminating an area or space which may include a flashlight 12 and a battery adapter cartridge 30. The flashlight may comprise a housing 14 that defines a battery compartment 16 which is configured to removably receive one or more batteries for powering one or more functions of the flashlight. More specifically, the batteries may provide power to a light source 18 which is typically located at one end of the elongated housing 14. In some implementations of the disclosure, the light source may be converted from one type of a light source to another type, preferably to accommodate a change in the voltage provided to the light source. Illustratively, an incandescent light source, the illumination of which may vary significantly based upon the voltage provided to it, may be converted to a light emitting diode (LED) light source which may provide a more uniform level of illumination over a greater range of voltages. While a higher voltage level may operate an incandescent light source, the light provided may be excessively or unnecessarily bright and the life of the light source may be shortened, but an LED light source may operate more uniformly at higher and lower voltages provided by a battery power source.

The housing 14 may include an opening 20 into the battery compartment, and typically the opening 20 is located at an end of the elongated housing 14 which is opposite of the position of the light source 18 on the housing, although in some configurations the opening 20 may be located adjacent to the light source. A removable cap 22 may close the opening 20 of the housing. The position of the cap 22 on the housing is dictated by the location of the opening 20, and thus the position of the cap 22 on the housing is typically opposite of the light source but in some embodiments the light source 18 may be mounted on or associated with the removable cap 22. The battery compartment 16 may be elongated in shape, and may define a generally cylindrical cavity in the housing 14, although the cavity may have other shapes. Illustratively, the battery compartment is sized and shaped to receive at least one battery, and typically for a plurality of batteries of the "D cell" configuration. Other suitable battery compartments may be configured for other battery sizes and shapes such as "C" cell batteries or lantern batteries may also be utilized. For example, the compartment may hold one to six or more batteries. Typically these batteries may be of the dry cell type, although the particular chemistry of the battery is not critical and the designation applied to the battery is more significant for the size and shape of the cell than the battery's particular chemistry or components. The size and shape of a D cell battery has been standardized and has a generally cylindrical shape with terminals located at opposite ends of the cylindrical body and has a diameter of approximately 1.3 inches (approximately 33 mm) and a length of approximately 2.5 inches (approximately 62 mm). The length of the cavity may thus be approximately equal to an integer multiple of approximately 2.5 inches. The cavity of the battery compartment may have a pair of electrical terminals 24, 25 which may be located at opposite ends of the cavity, and often at least one of the terminals is located on the removable cap 22 while the other terminal is relatively permanently mounted on the housing in the interior of the battery compartment.

In another aspect of the disclosure, a battery adapter cartridge 30 may be removably positonable in the battery compartment of the flashlight 12 for providing electrical power to the flashlight, and more particularly to the light source 18 of the flashlight. The cartridge 30 may be configured to replace at least one battery, and in many embodiments replaces a plurality of batteries, in the battery compartment, and may be configured to hold at least one battery. The cartridge 30 may be elongated with opposite ends 32, 33, and generally the cartridge 30 is configured such that the removable cap 22 of the flashlight housing is able to be mounted on the housing when the cartridge 30 is positioned in the battery compartment. This is typically achieved by making the length of the cartridge between the opposite end approximately equal to the length of the sum total length of the number of appropriately-sized batteries that the flashlight is designed to use. In some embodiments, the cartridge 30 may be configured to provide power to the flashlight using at least one less battery than the number of batteries that the battery compartment is designed to receive. In some embodiments, the cartridge may be designed to accommodate the same number of batteries as the battery compartment is designed to accommodate, although generally of a different type. Illustratively, the flashlight may have a battery compartment designed to receive three D cell batteries, and in such an application the cartridge may be designed to receive one to six or more batteries, typically of different cell size or configuration than the cell size for which the battery compartment is designed. It should be recognized that a size and shape that exactly corresponds to the sum length of the battery or batteries being replaced is not necessary, as most devices have battery compartments that permit a degree of variation in the size of the batteries through, for example, the use of contacts that employ springs or spring conductors for the terminals.

The adapter cartridge 30 may comprise a case 40, and the case may define at least one space or bay 42 for receiving a battery 1. In some of the most preferred embodiments, the case defines at least two bays 42, 44. Each bay may occupy a section of the case interior, with the bays being arranged along a longitudinal axis of the case although the bays are not necessarily physically separated from each other (e.g., by a separating wall or barrier). The case 40 may include a perimeter wall 46 which may extend about and define a case interior 50. The perimeter wall may extend between the opposite ends of the cartridge. An opening 52 may be formed in the case for each of the bays and the opening may be formed by a hole 54 in the perimeter wall of the case. The case 40 may also include a pair of end walls 56, 57 with each end wall being positioned at a respective end of the cartridge 30. In some embodiments, the end walls 56, 57 may be removable from the perimeter wall 46 of the case, but may also be unified with the perimeter wall.

The adapter cartridge 30 may include a pair of electrical contacts 58, 59 mounted on the case, with a first one 58 of the electrical contacts being mounted on a first end wall 56 of the case and a second one 59 of the electrical contacts being mounted on a second wall 57 of the case. The cartridge 30 may include at least one electrical connector 60 which is configured to connect to a battery positioned in one of the bays of the cartridge, and an electrical connector may be provided for each one of the bays of the case. Each of the electrical connectors may be connected to the pair of electrical contacts 58, 59 and an electrical connection may be formed between the connectors and the contacts by wires 62. Typically the wires 62 connecting the electrical connectors to the electrical contacts are arranged in a parallel electrical relationship, although a series electrical relationship may also be utilized. Advantageously, the parallel electrical relationship allows fewer than all of the batteries positioned in the bays to be connected to the electrical contacts 58, 59 and provide power to the flashlight. Thus, empty bays, or bays with a battery that is not engaged with an electrical connector, do not prevent the cartridge from functioning as a power source.

Illustratively, a case of an adapter cartridge designed to replace three D cell batteries may have an outer diameter of approximately 1.25 inches (approximately 32 mm) and a length of approximately 7.25 inches (approximately 185 mm).

In the illustrative embodiments, each bay 42, 44 may be configured to receive a 9 volt battery. The size and shape of a 9 volt battery (which may be a dry cell) has been standardized, and may have a dimension of approximately 1.9 inches (approximately 49 mm) high by approximately 1 inch (approximately 27 mm) long by approximately 0.7 inches (approximately 18 mm) wide, with a pair of electrical terminals positioned on one end face of the battery. In some embodiments, the hole for a bay may have a length of approximately 2 inches (approximately 50 mm) by approximately 0.75 inches (approximately 19 mm).

Optionally, a pair of openings 52 may be merged together to form a larger bay able to accommodate a plurality of the batteries, and a divider wall 64 may be removably mounted on the case in order to divide one section of the case interior for one bay from another section of the case for another bay when batteries are inserted into bays having a merged opening. The divider wall may be seated or located in the case by a notch or slot 66 formed in the edge of the hole 54, and may extend into opposite sides of the hole. A further slot 68 may be formed in the perimeter wall 46 at a location substantially opposite of the hole 54 to help secure a portion of the wall 64 that is spaced from the slots 66 adjacent to the hole 54. Significantly, the merged opening may permit the insertion through the merged openings into the case interior other items that may be useful to have in safekeeping, such as first aid items or items useful for starting a fire, which may benefit from the typically waterproof nature of the battery compartment of the flashlight housing 14.

The system 10 may include other embodiments, such as a cartridge with a case 70 (see FIG. 6) that includes two shell portions 72, 73 that that are mountable together to close the interior of the case, with one or more of the batteries positioned therein, and dismountable from each other to insert and replace the battery or other contents in the interior of the case. The shell portions 72, 73 may be semi-cylindrical in shape, although in some embodiments one shell portion may form a greater portion of the generally cylindrical case than the other portion. The case 70 may also include end walls 74, 75 that are positioned between the shell portions and may be attached to one of the shell portions. Other elements of the other embodiments described herein may be employed with this embodiment, such as the electrical connector 60. Divider walls may also be used with the case 70 to separate, for example, batteries from other items being stored in the case interior.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A battery adapter cartridge for removably positioning in a battery compartment of an electrically-powered device to provide electrical power to the electrically-powered device, the battery compartment having a pair of electrical terminals located at opposite ends of the battery compartment and being oriented in substantial opposition to each other, the battery adapter cartridge comprising:

an elongated case having opposite ends, the elongated case defining at least one bay capable of receiving a battery, the elongated case including a perimeter wall extending about a case interior, the at least on bay occupying a section of the case interior, an opening being formed in the elongated case for the at least one bay, the elongated case including a pair of end walls, each end wall of the pair of end walls being positioned at a respective one of the opposite ends of the elongated case and having an exterior side opposite of the case interior;

a pair of electrical contacts mounted on the elongated case, a first one of the pair of electrical contacts being mounted on a first one of the end walls located on a first one of the opposite ends of the elongated case and a second one of the pair of electrical contacts being mounted on a second one of the end walls located on a second one of the opposite ends of the elongated case;

at least one pair of electrical connectors configured to connect to a battery positioned in the at least one bay, the pair of electrical connectors and the electrical contacts being electrically connected;

wherein the first electrical contact is positioned on the exterior side of the first end wall to contact a first one of the electrical terminals of the electrically-powered device when the battery adapter cartridge is inserted into the battery compartment of the electrically-powered device; and wherein the second electrical contact is positioned on the exterior side of the second end wall to contact a second one of the electrical terminals of the electrically-powered device when the battery adapter cartridge is inserted into the battery compartment of the electrically-powered device.

2. The battery adapter cartridge of claim 1 wherein the at least one bay is configured to receive a 9V dry cell battery.

3. The battery adapter cartridge of claim 2 wherein the elongated case is configured with a length and width substantially corresponding to at least two D size dry cell batteries.

4. The battery adapter cartridge of claim 1 wherein the elongated case is configured with a length and width corresponding to a combination of a specific number of batteries, and the at least one bay of the elongated case includes a quantity of bays that is at least one less than the specific number of batteries.

5. The battery adapter cartridge of claim 1 wherein the opening is formed by a hole in the perimeter wall of the elongated case.

6. A system comprising:
an electrically-powered device including a housing defining a battery compartment configured to removably receiving dry cell batteries; and
a battery adapter cartridge removably positioned in the battery compartment of the electrically-powered device to provide electrical power to the electrically-powered device, the battery compartment having a pair of electrical terminals located at opposite ends of the battery compartment and being oriented in substantial opposition to each other, the battery adapter cartridge comprising:
an elongated case having opposite ends, the elongated case defining at least one bay capable of receiving a battery, the elongated case including a perimeter wall extending about a case interior, the at least on bay occupying a section of the case interior, an opening being formed in the elongated case for the at least one bay, the elongated case including a pair of end walls, each end wall of the pair of end walls being positioned at a respective one of the opposite ends of the elongated case and having an exterior side opposite of the case interior;
a pair of electrical contacts mounted on the elongated case, a first one of the pair of electrical contacts being mounted on a first one of the end walls located on a first one of the opposite ends of the elongated case and a second one of the pair of electrical contacts being mounted on a second one of the end walls located on a second one of the opposite ends of the elongated case;
at least one pair of electrical connectors configured to connect to a battery positioned in the at least one bay, the pair of electrical connectors and the electrical contacts being electrically connected;
wherein the first electrical contact is positioned on the exterior side of the first end wall to contact a first one of the electrical terminals of the electrically-powered device; and
wherein the second electrical contact is positioned on the exterior side of the second end wall to contact a second one of the electrical terminals of the electrically-powered device.

7. The system of claim 6 wherein the electrically-powered device comprises a flashlight with a light source configured to be powered by dry cell batteries when inserted into the battery compartment.

8. The system of claim 6 wherein the at least one bay is configured to receive a 9V dry cell battery.

9. The system of claim 6 wherein the at least one bay of the elongated case comprises at least two bays.

10. The system of claim 9 wherein the at least two bays are each configured to receive a 9V dry cell battery.

11. A battery adapter cartridge for removably positioning in a battery compartment of an electrically-powered device to provide electrical power to the electrically-powered device, the battery compartment having a pair of electrical terminals located at opposite ends of the battery compartment and being oriented in substantial opposition to each other, the battery adapter cartridge comprising:
an elongated case having opposite ends, the elongated case defining a plurality of bays, each bay being capable of receiving a battery, the elongated case including a perimeter wall extending about a case interior, each of the bays occupying a section of the case interior, an opening being formed in the elongated case for each of the bays, the elongated case including a pair of end walls, each end wall of the pair of end walls being positioned at a respective one of the opposite ends of the elongated case and having an exterior side opposite of the case interior;
a pair of electrical contacts mounted on the elongated case, a first one of the pair of electrical contacts being mounted on a first one of the end walls located on a first one of the opposite ends of the elongated case and a second one of the pair of electrical contacts being mounted on a second one of the end walls located on a second one of the opposite ends of the elongated case;
a pair of electrical connectors configured for connecting to a battery when the battery is positioned in one bay of the plurality of bays, the pair of electrical connectors and the electrical contacts being electrically connected;
wherein the first electrical contact is positioned on the exterior side of the first end wall to contact a first one of the electrical terminals of the electrically-powered device when the battery adapter cartridge is inserted into the battery compartment of the electrically-powered device; and
wherein the second electrical contact is positioned on the exterior side of the second end wall to contact a second one of the electrical terminals of the electrically-powered device when the battery adapter cartridge is inserted into the battery compartment of the electrically-powered device.

12. The battery adapter cartridge of claim 11 wherein at least one of the plurality of bays is configured to receive a 9V dry cell battery.

13. The battery adapter cartridge of claim 11 wherein the pair of electrical connectors comprises a plurality of pairs of electrical connectors, each pair of the plurality of pairs of electrical connectors being associated with each bay of the plurality of bays, the plurality of pairs of electrical connectors being electrically connected in a parallel electrical relationship.

14. The battery adapter cartridge of claim 11 additionally comprising a divider wall being positioned in the case interior between and substantially parallel to the pair of end walls and being removably mounted on the elongated case to divide one section of the case interior for a first bay of the plurality of bays from another section of the case interior for a second bay of the plurality of bays.

15. The battery adapter cartridge of claim 11 additionally comprising first aid items positioned in one bay of the plurality of bays.

16. The battery adapter cartridge of claim 11 additionally comprising fire starting materials positioned in one bay of the plurality of bays.

17. The battery adapter cartridge of claim 11 wherein the openings associated with plurality of bays are all positioned in a substantially linear arrangement extending from one of the opposite ends to an other one of the opposite ends of the case.

* * * * *